United States Patent [19]

Bodenbenner et al.

[11] 4,150,103

[45] Apr. 17, 1979

[54] FOAM PREVENTION DURING THE REGENERATION OF WASTE SULFURIC ACID WITH AROMATIC NITRO COMPOUNDS

[75] Inventors: Kurt Bodenbenner, Wiesbaden; Helmold von Plessen, Kelkheim, both of Fed. Rep. of Germany

[73] Assignee: Hoechst Aktiengesellschaft, Frankfurt am Main, Fed. Rep. of Germany

[21] Appl. No.: 853,312

[22] Filed: Nov. 21, 1977

[30] Foreign Application Priority Data

Nov. 23, 1976 [DE] Fed. Rep. of Germany ....... 2653088

[51] Int. Cl.$^2$ ...................... C01B 17/90; C01B 17/82; B01D 19/04
[52] U.S. Cl. .................................. 423/531; 423/523; 423/525; 252/321
[58] Field of Search ............... 423/523, 524, 525, 526, 423/527, 528, 529, 531; 203/12, 20; 252/321

[56] References Cited

U.S. PATENT DOCUMENTS 2,304,280  12/1942  Read .................................... 423/527

FOREIGN PATENT DOCUMENTS 2450255  5/1976  Fed. Rep. of Germany ........... 423/531

Primary Examiner—O. R. Vertiz
Assistant Examiner—Gary P. Straub
Attorney, Agent, or Firm—Curtis, Morris & Safford

[57] ABSTRACT

The foam formation arising when aqueous waste sulfuric acid is concentrated can be suppressed by adding aromatic nitro compounds such as nitrobenzene to the acid.

6 Claims, No Drawings

FOAM PREVENTION DURING THE REGENERATION OF WASTE SULFURIC ACID WITH AROMATIC NITRO COMPOUNDS

The present invention relates to a process for the regeneration by evaporation of water-containing waste sulfuric acid.

In many chemical processes, sulfuric acid is formed as waste product, which, in addition to water, contains organic and inorganic impurities, for example mineral salts, hydrogen chloride or nitric acid. The strength of this acid may vary within wide limits; for example, a dilute acid having a strength of from 5 to about 60%, or a waste acid having a strength of from 60 to 80% of $H_2SO_4$ may be obtained. There are several processes for the regeneration of such acids by evaporation of the water. This evaporation may be carried out under atmospheric pressure or reduced pressure (see U.S. Pat. No. 3,018,166; German Offenlegungsschrift No. 1,767,446). Generally, the choice of the evaporation method depends on the content of waste sulfuric acid. For example, a waste sulfuric acid of 60 to 80% strength may be concentrated to 95 to 97% strength according to the process described by H. Pauling in German Patent No. 299,774 (1915). More dilute acids may be evaporated in a circulating cyclone evaporator (see Chemical Economy & Engineering Review, July 1976, vol. 8, No. 6, pp. 42–48, and Chemie-Ing.-Technik 46, (1974), 898).

A circulating evaporator consists of a heat exchanger with indirect heating, generally by means of steam, and an evaporating pan, from which the water amounts stripped are passed to the condenser via a vapor duct. The circulation in the evaporator is ensured by means of heat or by means of a pump (forced circulation). The waste sulfuric acid to be concentrated, which contains from 5 to 60% of $H_2SO_4$ is continuously fed to the circulation system, in which a 60–80% acid circulates. The acid is removed at a suitable place from the system in such a manner that the volume of the circulating acid remains practically unchanged. The boiling temperature in the evaporator depends on the pressure and the sulfuric acid concentration attained. At a concentration of 70% $H_2SO_4$ and a pressure of 760 mm Hg, for example, the boiling temperature in the evaporator is 165° C., and under a pressure of 100 mm Hg, it is only 110° C.

When the waste sulfuric acid contains organic impurities, foaming may occur in the evaporator. In such cases, not only steam is forwarded to the condensate, but also foam having very fine bubbles, which entrains considerable amounts of acid. Simultaneously, the heat transfer in the evaporator is deteriorated, because the circulating acid is combined with foam. Under these conditions, the evaporation operations are hindered or even completely stopped.

Similar problems arise in the Pauling process when acids are treated which tend to foaming. In this process, the waste sulfuric acid is forwarded to a stripping column which is mounted on a vessel of grey cast iron serving as distillation unit. The vessel heated with gas or mineral oil is charged with boiling concentrated sulfuric acid, which is taken off at a rate corresponding to the feed rate, and cooled. The water contained in the waste acid leaves the stripping column in the form of vapor. In the case of industrial Pauling plants, the temperature of the top plate of the stripping column is about 150° C. The vapor having a temperature of about 125° C. is sucked off by water jets or suction fans. The stripping column is generally made from silicon cast iron and designed as bubble plate column.

In the case of acids which tend to foaming, the foam is formed in the stripping column of the Pauling plant. This foam formation causes such a drop in pressure in the column that the vacuum in the vessel is partially or fully neutralized, and sulfuric acid vapor, possibly also nitrous gases or sulfur dioxide may escape at the places of packing between the vessel and the column. This rise of pressure in the vessel may be counterbalanced by reducing the feed. However, this causes the yield of the Pauling plant to be reduced (see FIAT Final Report No. 1187, Film K-18, p. 553/554). Moreover, in the case of heavy foaming, the exchange of substance and heat in the stripping column is deteriorated, and acid-containing foam is entrained into the vapor duct and the jets or fans which maintain the vacuum in the vessel (see German Patent No. 679 850). When regenerating waste sulfuric acid which contains inorganic impurities, nitric acid is sometimes added as oxidant, and fed to the vessel for example by means of an immersion tube. In the case of waste acid tending to foam formation, this addition of oxidant still increases the foam formation or the stability of the foam, which then become viscous and finely lamellar, and decomposes only slowly.

It was therefore the object of the present invention to provide a process which prevents foam formation on concentration of water containing waste sulfuric acid. In accordance with this invention, there is provided a process for the regeneration of waste sulfuric acid by distilling off water, which comprises suppressing a possible foam formation by addition of aromatic nitro compounds being free from amino and hydroxy groups.

The process of the invention may be carried out under normal or reduced pressure, in circulating evaporators, in the Pauling process or other kown concentration processes for waste sulfuric acid. It is especially suitable for the regeneration of 5 to 60% waste sulfuric acid in a circulating evaporator where a 60–80% acid is obtained, or for the evaporation of 60–80% $H_2SO_4$ in a Pauling plant, where an about 95 to 97% $H_2SO_4$ is obtained. In accordance with this invention, the aromatic nitro compounds being free from amino and hydroxy groups may be used per se or as mixtures with each other, or in admixture with other auxiliaries, or as a solution, in order to suppress any foaming. Thus, for example, solutions in concentrated sulfuric acid or a suitable organic solvent which is easily evaporated may be employed. Even the waste sulfuric acid itself may be used, and in this case, the solution containing the nitro compound may be fed for example to the sump of the circulating evaporator.

Suitable aromatic nitro compounds being free from amino and hydroxy groups and having a defoaming action are for example nitrobenzene derivatives such as nitrobenzene, 2-nitrotoluene, 3-nitrotoluene, 2-chloronitrobenzene, 4-chloronitrobenzene, 1,3-dinitrobenzene, 2-chloro-4-nitrotoluene; and nitronaphthalenes such as 1-nitronaphthalene. Preferred are compounds which contain as substituents beside nitro groups only alkyl groups (especially those having from 1 to 4 carbon atoms) and halogen atoms.

For defoaming, the aromatic nitro compounds are added to the waste sulfuric acid; the mixture so obtained may be fed for example to the sump of the circulating cyclone evaporator or the stripping column of the Pauling apparatus. Alternatively, defoaming is ensured also when the aromatic nitro compounds are fed in independently from the waste sulfuric acid.

The concentration of the aromatic nitro compounds in the waste sulfuric acid may vary within wide limits, and it depends mainly on the impurities of the acid. Suitable contents are from 0.001 to 10% by weight, preferably 0.01 to 3% by weight, of nitro compound, relative to the amount of waste sulfuric acid. Generally, under the influence of the aromatic nitro compounds, the foam which has formed collapses within a few seconds. Since the nitro compounds have a considerable vapor pressure, they are entrained by the vapors of the waste sulfuric acid formed in the evaporation process, so that the defoaming activity of the aromatic nitro compounds is generally exhausted after a certain time. When the vapors are collected in a condenser, for example a tube nest heat exchanger made from glass, the aromatic nitro compounds distilled off may be separated from the aqueous phase and reused as defoamer.

Separation of phases and recycling of the defoamer may be carried out in a fully continuous manner by suitable separator devices. However, there is a certain consumption of defoamer under these conditions, since part of it remains in dissolved form in the acid leaving the evaporator. In the case where this acid is to be further concentrated (for example to 95% strength), a renewed addition of defoamer may be omitted in this further concentration step. On the other hand, of course, aromatic nitro compounds in accordance with this invention may be employed in both concentration steps, but in many cases it will be sufficient to add the defoamer in one step only. Anyhow, whether defoamer is added in the second concentration step or not, it may be isolated from the second step and recycled to the first one.

The use of aromatic nitro compounds as defoamer in accordance with this invention is not limited to a defined regeneration method but may be extended to other than the cited processes. Very often, nitric acid, nitrosylsulfuric acid or other oxidants are added to a waste sulfuric acid containing organic impurities, in order to obtain an oxidative degradation of these organic compounds under the conditions of the evaporation processes. The aromatic nitro compounds, preferably nitrobenzene, may act too in some cases as oxidants and thus facilitate the intended regeneration.

The defoaming action of the aromatic nitro compounds being free from amino and hydroxy groups is surprising because other aromatic compounds of simple structure, which are volatile in steam, for example 1,2-dichlorobenzene or phthalic acid, have no effect whatsoever or to a very small extent only. The same goes for aliphatic hydrocarbons, for example petroleum spirit (boiling range 100°–140° C.), which have no effect either. On the other hand, compounds such as 2-nitro-1-naphthol or 4-nitro-2-aminotoluene, still increase the foaming of the sulfuric acid in some regeneration processes, for example the Pauling process.

The composition of the acid to be regenerated is not critical. In principle, all waste sulfuric acids cited in Oscar T. Fasullo, Sulfuric Acid, New York 1965, may be worked up according to the process of the invention. There may be used for example acids having a strength of from 5 to 90% by weight. Their water content may be from 5 to 90, especially 20 to 80, % by weight. The acid may furthermore contain inorganic components (for example hydrogen halide, phosphoric acid, alkali metal sulfate, ammonium sulfate or heavy metal ions) as well as organic impurities. The amount of organic impurities (calculated as C) should not exceed 2% by weight, relative to $H_2SO_4$.

The following Examples illustrate the invention.

EXAMPLE 1

3 ml of a mixture of waste sulfuric acids (68.5% of $H_2SO_4$; 0.68% of C; 0.08% of N according to Kjeldahl; 0.12% of ashes) were thoroughly shaken 5 times each at room temperature in a 10 ml graduated cylinder ; after having waited for 10 seconds, the foam volume was measured. The influence of nitric acid on the foam formation was tested by adding dropwise 65% $HNO_3$. Nitrobenzene was used as defoamer. The results are listed in the following Table.

| 65% $HNO_3$ drops added | nitrobenzene drops added | Reading of foam volume after 10 seconds (cc) |
|---|---|---|
| — | — | 1.0; 0.9; 0.5; 0.5 |
| 1 | — | 1.40; 1.10; 0.75; 0.75 |
| 2 | — | 1.20; 1.10; 0.8 |
| 3 | — | 1.20; 0.95; 1.05 |
| 4 | — | 1.30; 1.20; 0.80; 0.80 |
| — | 1 | 0.2; 0.1; <0.1 |
| 4 | 1 | 0.1; <0.1; <0.1 |

EXAMPLE 2

On top of a laboratory evaporator with forced circulation made from glass, which is heated by means of heat transfer oil, is mounted a fractionating head for azeotropic distillation. This head makes it possible to remove the specific lighter component (water) of the condensate from the system and to return the specific heavier component (nitrobenzene) to the boiling sump. On top of the fractionating heat is mounted a reflux condenser. 600 ml of 70% sulfuric acid were introduced into the evaporator. Subsequently, 960 g/h of 40% waste acid were fed in continuously at normal pressure and a sump temperature of 160° C. The acid removed continously from the sump has a strength of 70% $H_2SO_4$. The waste acid introcuced contained besides 40% $H_2SO_4$ 0.57% C, 0.12% N according to Kjeldahl, 0.15% of total N and 0.03% ashes at 600° C. Under these conditions, the acid foams heavily in such a manner that evaporation is impossible. After having filled the fractionating head with nitrobenzene and $H_2O$, nitrobenzene was added continously to the boiling acid at the same rate as it was removed from the evaporator in dissolved foam with the concentrated acid. The amount of nitrobenzene corresponded to 1% relative to the 40% waste acid introduced, and foam formation was then totally suppressed.

What is claimed is:

1. In a process for the regeneration of aqueous waste sulfuric acid by distilling off water during which the acid tends to foam, the improvement which comprises adding an aromatic nitro compound free from amino and hydroxy groups in an amount sufficient to suppress foam formation.

2. The process as claimed in claim 1, wherein a waste sulfuric acid having a strength of from 5 to 60% by weight is concentrated to an acid having a strength of from 60 to 80% in a circulating evaporator.

3. The process as claimed in claim 2, which comprises concentrating a waste sulfuric acid having a strength of from 20 to 60% by weight.

4. The process as claimed in claim 1, which comprises concentrating a sulfuric acid having a strength of from 60 to 80% to a strength of from 95 to 97% $H_2SO_4$ in a Pauling plant.

5. The process as claimed in claim 1, wherein an aromatic nitro compound is added in an amount of from 0.001 to 10% by weight.

6. The process as claimed in claim 1, wherein the aromatic nitro compound is nitrobenzene.

* * * * *